L. G. TINGWALL AND A. J. JOHNSON.
CONVERGER FOR CONVEYERS.
APPLICATION FILED MAY 5, 1921.
1,425,557.
Patented Aug. 15, 1922.
2 SHEETS—SHEET 1.
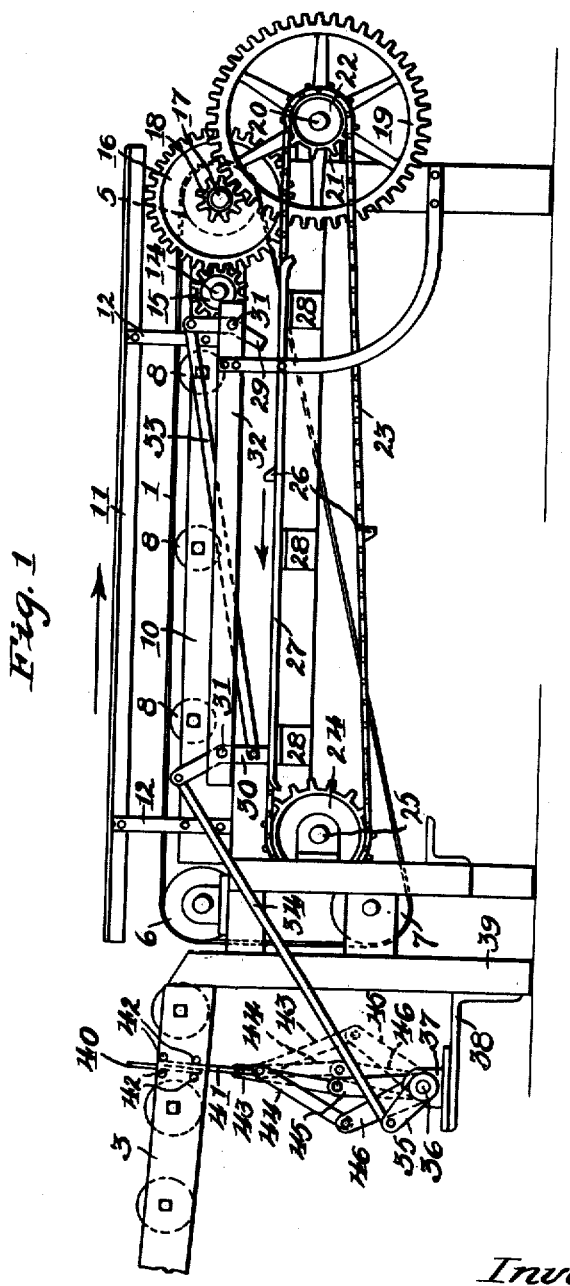
Inventors:
Lloyd G. Tingwall,
Arthur J. Johnson
by: John E. Shyler
their Attorney.

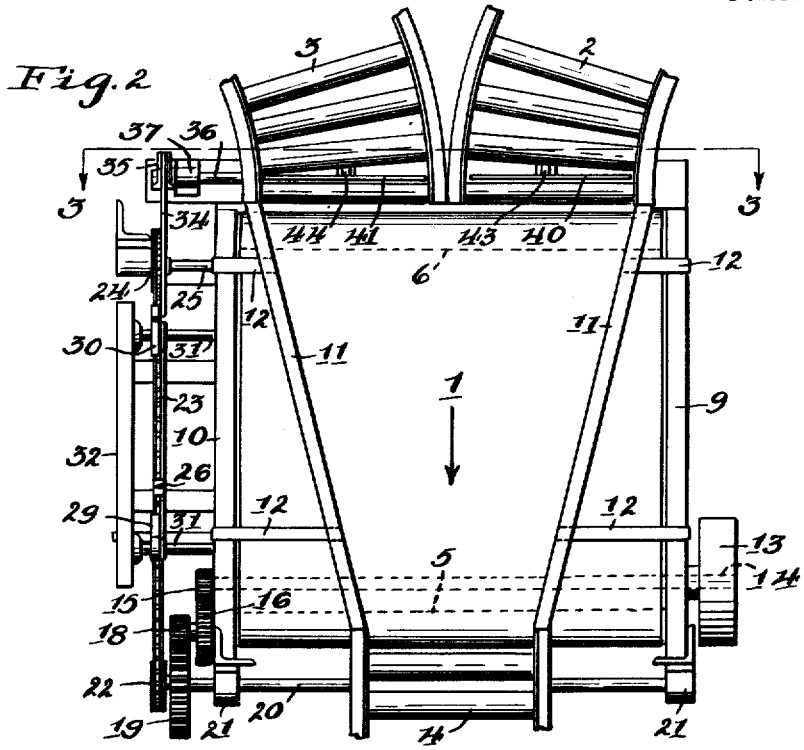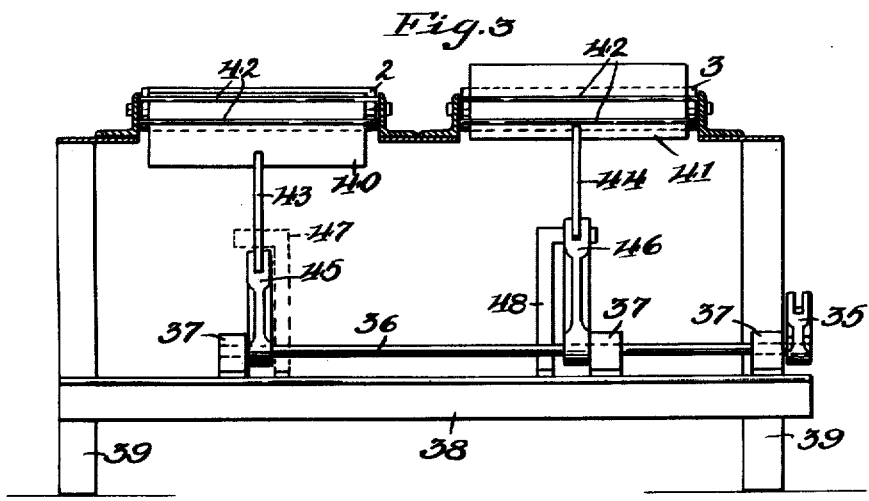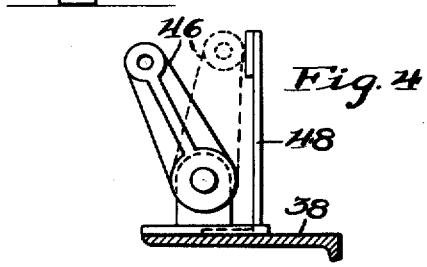

UNITED STATES PATENT OFFICE.

LLOYD G. TINGWALL AND ARTHUR J. JOHNSON, OF ST. PAUL, MINNESOTA, ASSIGNORS TO STANDARD CONVEYOR COMPANY, A CORPORATION OF MINNESOTA.

CONVERGER FOR CONVEYERS.

1,425,557.   Specification of Letters Patent.   Patented Aug. 15, 1922.

Application filed May 5, 1921. Serial No. 467,104.

*To all whom it may concern:*

Be it known that we, LLOYD G. TINGWALL and ARTHUR J. JOHNSON, citizens of the United States, residing at St. Paul, in the county of Ramsey and State of Minnesota, have invented new and useful Improvements in Convergers for Conveyers, of which the following is a specification.

The object of our invention is to provide efficient means for converging a plurality of conveyers into a single line of conveyers.

A further object of our invention is to provide a device of this kind which is automatic in operation and designed to preclude the possibility of packages jamming at the junction of the conveyers.

Other objects of our invention will appear and be more fully pointed out in the following specification and claims.

The drawings forming a part of this specification illustrate what we at present believe to be the best form of our device but it will be readily understood that modifications are possible within the spirit of our invention.

Referring to the accompanying drawings Figure 1 is a side elevation of our improved converger; Fig. 2 is a plan view of the same in connection with a series of gravity conveyers; Fig. 3 is a section taken on the line 3—3 of Fig. 2 and Fig. 4 is a detail of a part of one of the toggle joints together with the stop therefor.

Our device consists of an endless belt 1 arranged to conduct packages, boxes and the like from two conveyers 2 and 3 to a conveyer 4. The endless belt 1 passes around drums 5, 6 and 7 and the upper run of said belt is supported by three idler rollers 8. Said rollers and drums are revolubly mounted in suitable bearings in lateral standards 9 and 10 of a supporting frame and a pair of converging guide angle irons 11 are attached to brackets 12 on the standards 9 and 10. These guides are adapted to direct packages from the conveyers 2 and 3 to the conveyer 4.

The belt 1 is driven in the direction indicated by the arrows (Figures 1 and 2) by means of a pulley 13 which is mounted on a transverse shaft 14 and connected by gears 15 and 16 to the shaft 17 upon which the drum 5 is rigidly mounted. The pulley 13 is designed to be driven by a belt from a suitable motor. A small pinion gear 18 is also rigidly mounted on the shaft 17 and arranged to drive a large gear 19. The latter gear is fast on a shaft 20 which is supported by brackets 21 on the end of the frame. Outside of the gear 19 and rigidly mounted on the end of the shaft 20 is a sprocket gear 22, arranged to drive an endless chain 23. The opposite end of the chain 23 is carried by a second sprocket gear 24, said gear being revolubly mounted on a shaft 25 in the frame. Lugs 26 are fastened to the chain 23 at intervals for the purpose hereinafter described and the upper run of said chain is supported by a channel bar 27. This bar 27 is secured by three brackets 28 to the standard 10 and is provided to hold the chain 23, carrying the lugs 26 in proximity to a pair of levers 29 and 30.

The levers 29 and 30 are pivotally mounted upon shafts 31 and said shafts are supported at their ends by a beam 32 and the standard 10. The upper end of the lever 29 is connected by a link bar 33 to the lever 30 near its lower end and the upper end of the latter lever is connected by a bar 34 with a crank 35 on a shaft 36. The connections between the bars 33 and 34, and the levers 29 and 30 and the crank 35 are all pivotal. By this arrangement the lower end of one of the levers 29 and 30 always projects into the path of the lugs 26 so that said levers are actuated by said lugs.

The shaft 36, as clearly shown in Figures 1 and 3, is mounted in brackets 37 upon the upper surface of a transverse angle iron 38. This angle iron is rigidly fastened at its ends to the legs 39 supporting the conveyers 2 and 3, and the shaft 36 is revoluble in suitable bearings in the brackets 37. Toggle joints connect the shaft 36 with a pair of stops 40 and 41 adjacent to the end roller of the conveyers 2 and 3, respectively. These stops are moved to project successively into the path of packages on the conveyers 2 and 3 as follows: A series of transverse rods 42 are secured at their ends in the side rails of the conveyers 2 and 3 to form guides for substantially vertical movement of the stops 40 and 41 and the lower ends of said stops are severally connected by links 43 and 44 with cranks 45 and 46, respectively, the lower ends of said cranks being secured to the shaft 36. (See Figure 1). Stops 47 and 48 (see Figures 3 and 4) are provided to limit the movement of the cranks 45 and 46, respectively.

The stops 47 and 48 are omitted from Figure 1 as they would obscure other parts of the figure.

Operation.

In operation the belt 1 is driven in the direction indicated by the arrows in Figures 1 and 2 so as to carry packages delivered to said belt by the conveyers 2 and 3 to the conveyer 4. The pinion gear 18, on the end of the shaft 17, carrying the drum 5, slowly rotates the large gear 19 and shaft 20. This moves the chain 23, carrying the lugs 26 in the direction indicated in Figure 1. The lugs first strike the lower end of the lever 29 and move said lever to the position shown in Figure 1 and by means of the link bar 33 move the lever 30 into the path of said lugs. As this is done the bar 34 tilts the crank 35 and turns the shaft 36, carrying the cranks 45 and 46 to their full line position, as shown in Figure 1. Thus the crank 45 is brought against the stop 47 and the stop 40 is moved into the path of packages on the conveyer 2, the crank 46 being at the same time moved to withdraw the stop 41 from the path of the packages on the conveyer 3. This allows packages on the latter conveyer to be deposited by gravity on the moving belt 1 and said belt carries the packages to the conveyer 4.

As movement of the chain 23 continues, the lug 26, which has just actuated the lever 29, strikes the lever 30 and tilts the same to bring the toggle joints on the shaft 36 to their dotted line position as shown in Figure 1 and simultaneously moves the lever 29 back into the path of the succeeding lug 26. This movement, as will be readily understood, withdraws the stop 40 from the path of the packages on the conveyer 2 and moves the stop 41 to block the passage on the conveyer 3. Thus the shaft 36 is given oscillating movement to actuate the stops 40 and 41 whereby the passageways on the conveyers 2 and 3 are alternately and severally opened and closed to permit packages to be delivered to the belt 1 and congestion or jamming on the converger is made impossible. By changing the number and position of lugs 26 on the chain 23 the length of time that each of the conveyers 2 and 3 is allowed to remain open is regulated.

Having described our invention what we claim as new and desire to protect by Letters Patent is:

1. In a converger, a frame, an endless belt mounted in said frame, a plurality of conveyers adapted to deliver packages to said belt, stops arranged to be moved consecutively into the path of said conveyers and means for moving said stops into and out of the path of packages on said conveyers.

2. In a converger, a frame, an endless belt mounted in said frame, two conveyers adapted to deliver packages to said belt, stops arranged to be moved consecutively into the path of said conveyers and means for alternately and severally moving said a receiving conveyer arranged to take packages on said conveyers.

3. In a converger, a frame, an endless belt mounted in said frame, a plurality of conveyers adapted to deliver packages to said belt, stops arranged to be moved successively into the path of said conveyers, means for moving said stops into and out of the path of the packages on said conveyers and a receiving conveyer arranged to take packages from said belt.

4. In a device of the class described, a frame, drums mounted near opposite ends of said frame, an endless belt around said drums, a plurality of conveyers arranged to deliver packages to said belt at one end of said frame, a single conveyer adapted to receive packages from the said belt at the opposite end of said frame, an endless chain mounted on said frame, a lug on said chain, stops arranged to be moved severally into the path of said first mentioned conveyers and means actuated by said lugs for moving said stops alternately into and out of the path of packages on said first mentioned conveyers.

5. In a device of the class described, a frame, drums mounted on opposite ends of said frame, an endless belt around said drums, a plurality of conveyers arranged to deliver packages to said belt at one end of said frame, a single conveyer adapted to receive packages from the said belt at the opposite end of said frame, an endless chain mounted on said frame, a lug on said chain, levers arranged to be tilted by said lug, stops adapted to be moved severally into the path of said first mentioned conveyers by tilting motion of said levers and means actuated by said lugs for moving said stops alternately into and out of the path of packages on said first mentioned conveyers.

6. In a device of the class described, a frame, drums mounted on opposite ends of said frame, an endless belt around said drums, conveyers arranged to deliver packages to said belt at one end of said frame, a single conveyer adapted to receive packages from the said belt at the opposite end of said frame, guides supported above said belt on said frame to direct packages to said single conveyer, an endless chain mounted on said frame, a lug on said chain, stops adapted to be moved severally into the path of said first mentioned conveyers and means actuated by said lugs for moving said stops alternately into and out of the path of packages on said first mentioned conveyers.

7. In a device of the class described, a frame, drums mounted on opposite ends of said frame, an endless belt around said drums, rollers arranged in said frame to support the upper run of said belt, a plurality of conveyers arranged to deliver packages to said belt at one end of said frame, a single conveyer adapted to receive packages from said belt at the opposite end of said frame, guides supported above said belt on said frame to direct packages to said single conveyer, a transverse shaft mounted on said frame, stops connected with said shaft and arranged to be moved severally into the path of packages on said first mentioned conveyers and means for imparting oscillating motion to said shaft.

8. In a device of the class described, a frame, an endless belt mounted in said frame, a plurality of conveyers arranged to deliver packages to said belt, a single conveyer adapted to receive packages from said belt, a transverse shaft mounted on said frame, stops arranged to be moved severally into the path of packages on said first mentioned conveyers, toggle joints connecting said stops with said shaft and means for oscillating said shaft.

9. In a device of the class described, a frame, an endless belt mounted in said frame, a plurality of conveyers arranged to deliver packages to said belt, a single conveyer adapted to receive packages from said belt, a transverse shaft mounted on said frame, stops arranged to be moved severally into the path of packages on said first mentioned conveyers, toggle joints connecting said stops with said shaft, an endless chain mounted in said frame, a lug on said chain and means actuated by said lug for oscillating said shaft.

In testimony whereof, we have hereunto signed our names to this specification.

LLOYD G. TINGWALL.
ARTHUR J. JOHNSON.

Certificate of Correction.

It is hereby certified that in Letters Patent No. 1,425,557, granted August 15, 1922, upon the application of Lloyd G. Tingwall and Arthur J. Johnson, of St. Paul, Minnesota, for an improvement in "Convergers for Conveyers," an error appears in the printed specification requiring correction as follows: Page 2, lines 71 and 72, claim 2, strike out the words "a receiving conveyer arranged to take packages on said conveyers," and insert instead *stops into and out of the path of the packages on said conveyers;* and that the said Letters Patent should be read with this correction therein that the same may conform to the record of the case in the Patent Office.

Signed and sealed this 26th day of September, A. D., 1922.

[SEAL.]

WM. A. KINNAN,
*Acting Commissioner of Patents.*